United States Patent

Dyment et al.

[15] 3,688,388

[45] Sept. 5, 1972

[54] METHOD OF MAKING Q-SWITCHED DIODE LASER

[72] Inventors: John C. Dyment, Chatham, N.J.; Jose E. Ripper, North Plainfield, both of N.J.

[73] Assignee: Bell Telephone Laboratories, Incorporated, Murray Hill, Berkeley Heights, N.J.

[22] Filed: Nov. 14, 1968

[21] Appl. No.: 775,777

[52] U.S. Cl. ......................29/569, 29/572, 148/189, 317/235 N

[58] Field of Search ...............29/569, 572; 331/94.5; 148/189; 317/235

[56] References Cited

OTHER PUBLICATIONS

M. B. Khambaty, U. K. Chattersee, M. V. G. Menon & H. C. Pant, A Study of Gallium Arsenide Injection Laser & Inv. In Its Application In A Comm System, Indian Journal of Applied Physics, Vol. 7 January 1969 (Manuscript Oct. 5, 1968) p. 29.

Electroluminescent Diodes & Arrays, Marinace & Lutz, IBM Technical Disclosure, Vol. 8 No. 11, April 1966.

*Primary Examiner*—John F. Campbell
*Assistant Examiner*—Carl E. Hall
*Attorney*—R. J. Guenther and Arthur J. Torsiglieri

[57] ABSTRACT

A junction diode laser which exhibits internal Q-switching can be fabricated from a direct gap semiconductor substrate having a sufficiently low concentration of donor impurities by the steps of diffusing a shallow p-doped region into the substrate by a sufficiently slow diffusion process, heat-treating the doped substrate, applying stripe geometry electrical contacts, and forming the substrate into a laser cavity. These lasers are potentially useful in light communications systems utilizing pulse code modulation.

6 Claims, 3 Drawing Figures

INVENTORS J.C. DYMENT
J.E. RIPPER
BY
ATTORNEY

METHOD OF MAKING Q-SWITCHED DIODE LASER

This invention relates to a junction diode laser which exhibits internal Q-switching and to a method for making such a laser.

BACKGROUND OF THE INVENTION

In an article entitled "Internal Q-Switching in GaAs Junction Lasers" published in 12 *Applied Physics Letters* ( June, 1968), we have reported the first observation of internal Q-switching in specially fabricated junction diode lasers.

The chief difference between the operation of a conventional diode laser and a Q-switched one is the response of the respective lasers to input current pulses. Specifically, a conventional diode laser emits stimulated emission during the current pulse while a Q-switched laser emits stimulated emission only at the end of the current pulse.

This Q-switching behavior is highly promising for use with optical communication systems such as those proposed by S. E. Miller in "Communication by Laser," 214 *Scientific American* 19, January, 1967. For example, a series of current pulses of variable length or having a variable repetition rate can be used to modulate a Q-switched diode laser in a pulse code system. Alternatively, the amplitude of the Q-switching bursts can be modulated by varying the amplitude of the current pulse.

The theory and operation of conventional junction diode lasers is described in numerous papers ( See, for example, M. I. Nathan, "Semiconductor Lasers," 54 Proc. IEEE 1276, October 1966). A typical diode laser comprises a crystal of a direct gap semiconductor, such as gallium arsenide, having appropriate dopings to produce a p-n junction diode therein. A reflecting cavity is typically formed by polishing or cleaving a pair of opposed crystal faces perpendicular to the plane of the junction.

In operation, the diode is forward-biased to inject electrons into the p-doped region. The electrons, which travel toward the junction region, drop from the conduction energy band to the valence energy band emitting photons of light. At low currents, only low intensity spontaneous emission takes place because many of the photons are absorbed in inactive parts of the diode. At sufficiently high currents, however, a population inversion takes place and stimulated emission or "lasing" is produced. The polished crystal faces results in single or multimode optical emission. Improved mode control can be achieved through the use of a "-stripe geometry" electrical contact such as is described in U.S. Pat. No. 3,363,195, issued to R. A. Furnanage and D. K. Wilson on Jan. 9, 1968. ( See J. C. Dyment and L. A. D'Asaro, "Continuous Operation of GaAs Junction Lasers on Diamond Heat Sinks at 200° K," 11 *Applied Physics Letters* 292, November 1967).

SUMMARY OF THE INVENTION

In accordance with the present invention, it has been discovered that a junction diode laser can exhibit internal Q-switching, and methods have been discovered for fabricating such Q-switching diode lasers reliably. In particular, it has been found that diodes which are fabricated in a manner to produce a transition temperature, T, below about 150° C, will typically exhibit Q-switching.

BRIEF DESCRIPTION OF THE DRAWINGS

The foregoing and additional aspects of the invention will be more readily understood by reference to the drawings in which:

FIG. 2 is a flow chart of the process involved in making a junction laser having a Q-switching region.

DETAILED DESCRIPTION

Figure 1A:
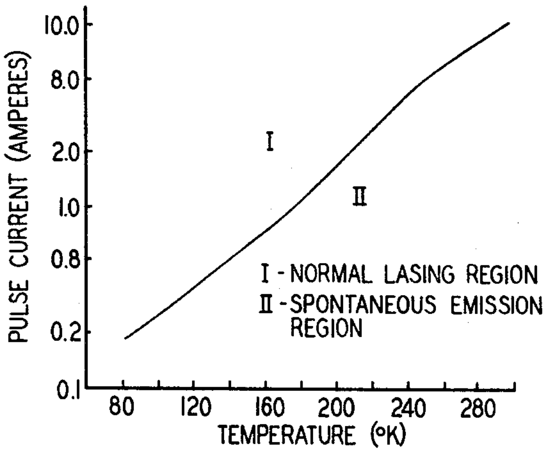
FIG. 1A (PRIOR ART)
FIGS. 1A and 1B are graphical illustrations showing the operating characteristics of typical conventional and Q-switching diode lasers, respectively.

FIG. 1A is a graphical representation showing the operating regions of a typical conventional diode laser as a function of pulse current amplitude and temperature. When a current pulse is applied to the conventional laser, either normal lasing ( Region I) or spontaneous emission (Region II) is observed. In normal lasing, stimulated emission is observed after a delay time, *t*, which can vary from a few to a few hundred nanoseconds, depending on the temperature, and continues for the remaining duration of the pulse. In most diode lasers, there is a transition temperature, T, below which *t* is very short and above which *t* is relatively long. (See J. C. Dyment and J. E. Ripper, IEEE *Journal of Qu antu m Electronics*, Vol. QE-4, p. 155, 1968).

Figure 1B:
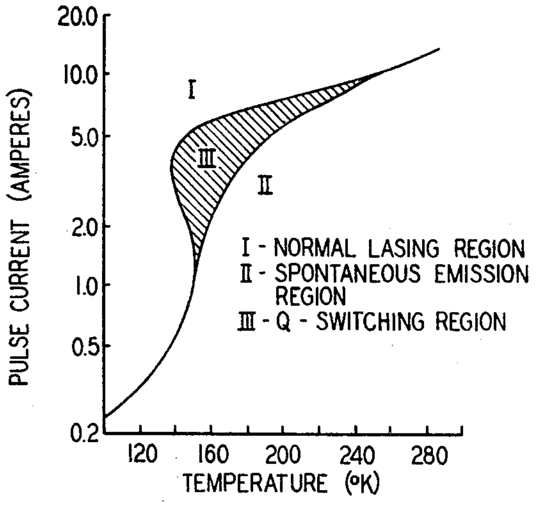

FIG. 1B is a graphical representation showing the operating regions of a typical internally Q-switched laser made in accordance with the invention. Such a Q-switched laser includes a third region ( III) — shaded in the drawing — where no stimulated emission is observed until the end of the current pulse. At the end of the pulse, the diode exhibits a narrow burst of stimulated light which is typically less than 400 picoseconds long. This behavior was observed for current pulse lengths throughout the reported experimental range from two nanoseconds to several microseconds and appeared to be independent of the particular pulse rate used, provided heating effects were avoided. Increases in current amplitude within Region III were found to produce increases in the amplitude of the terminal emission of light.

It has been found that this Q-switching effect is present only in junction lasers in which the transition temperature, T, between short and long delays is low — typically less than 150° C. One way of reliably producing lasers having a sufficiently low transition temperature is by the use of a special fabrication procedure which includes the use of a lightly doped n-type semiconductor substrate, a diffusion of p-type impurities into the substrate and a special heat treatment.

As indicated in FIG. 2, which is a flow chart of the process involved in making a junction diode laser having a Q-switching region, the initial step involves forming a substrate of a direct gap semiconductor, such as a wafer of gallium arsenide having a sufficiently low concentration of donor impurities. In general, the substrate is formed by one of the techniques known in the art for the production of substrates for laser diodes, but the concentration of donor impurities is kept as low as is possible consistent with reasonable lasing efficiency. The donor impurity concentration for gallium arsenide, for example, should give free electron concentrations less than $2.8 \times 10^{18}$ per cubic centimeter as no Q-switching was observed in lasers above this concentration. Experiments indicate that the free electron concentration is advantageously between $0.7 \times 10^{18}$ and $1.4 \times 10^{18}$ carriers per cubic centimeter; and, preferably, about $1 \times 10^{18}$. Suitable n-type dopants for gallium arsenide include tellurium, selenium, silicon and tin.

The next step involves the formation of a shallow p-doped region in the n-doped substrate by a diffusion process. In general, the junction depth must be sufficiently shallow that the lasing region can be well defined such as by use of a stripe geometry contact structure described in the aforementioned Furnanage et al patent. On the other hand, the diffusion depth must be greater than the diffusion length of the injected electrons in order to avoid non-radiative surface recombinations. Thus, for gallium arsenide, the diffusion depth is typically between about four microns and one micron, with about 2.5 microns being the preferred depth.

It was found advantageous for Q-switching that the p-doped region either be made by a diffusion process which is "slow" ( i.e., one having a diffusion time of at least 4 hours) or that the resulting structure be given a special heat treatment to be described below. Preferably, both techniques are used to obtain a laser having an enhanced Q-switching region.

The diffusion step is conveniently accomplished by what is known in the art as the "box" method of diffusion. ( See L. A. D'Asaro, 1 *Solid State Electronics* 3, 1960). For a gallium arsenide substrate, this method involves placing both the n-doped substrate and an impurity source comprising a solution of an impurity material, such as zinc, dissolved in gallium (saturated with undoped gallium arsenide), in a closed box having an inert gas ambient and heating the box. For typical diffusion temperatures on the order of 800° C, it has been found that the best lasers for Q-switching are those using diffusion times in excess of four hours and diffusion sources containing less than 1 percent of impurity concentration. Diffusion times as short as an hour and diffusion sources as strong as 2.5 percent can be used, but the resulting structures appear to need to be heat treated to exhibit high reliability Q-switching.

While not always necessary to produce Q-switching, heat treatment was generally found desirable to enhance the Q-switching properties of the diode. In this heat-treating step, a protective layer, such as about 2,000 angstroms of $SiO_2$ is deposited on the p-type surface to prevent surface pitting, and the structure is heated for at least one-half hour at a temperature between 700° C and 1,000° C. For example, the gallium arsenide substrate is placed in a quartz ampoule containing a few milligrams of arsenic. This ampoule is then evacuated to a pressure of $10^{-7}$ millimeters of mercury, sealed and heated about 4 hours at 850° C.

After the heat-treating step, the electrical contacts to the n- and p-regions of the diode are formed. The stripe geometry contact structure described in both the aforementioned Furnanage patent and the Dyment and D'Asaro article is preferred because it sufficiently localizes the lasing region that the Q-switching effect is well-defined and observable. The area of the stripe contact is defined by selectively etching an oxide layer using standard photolithographic techniques; metals appropriate for contacting n- and p-layers, described below in Example I, are then deposited.

As a final step, the diode is shaped to form a suitable laser cavity. In accordance with the usual practice, the substrate is scribed and cleaved to form individual diode lasers with rectangular Fabry-Perot cavities.

The following examples further illustrate the fabrication of an internal Q-switched diode in accordance with the invention. In these examples, the n-type substrate used is gallium arsenide doped with tin and has a free electron concentration of about $1 \times 10^{18}$ per cubic centimeter.

EXAMPLE I

A p-doped region is diffused into the n-doped substrate using the box method with a source comprising a 0.6 percent solution of zinc in gallium saturated with gallium arsenide. The diffusion time is 4 hours at 810° C. The depth of the junction thus formed is about 2.5 microns. No heat treatment is required.

After diffusion, a 1,000 angstroms thick layer of $SiO_2$ is applied, and stripes having dimensions of $12.7 \times 380$ microns are cut through the oxide on the p-doped region by photolithographic methods. A second diffusion is then carried out in order to make a good ohmic contact to the p-doped region. This diffusion does not alter original diffusion and is only used to make good contacts. This step is carried out using the box method and a pure zinc arsenide source. The diffusion time is 15 minutes at 650° C. This forms a heavily doped layer in the p-region with a thickness of less than 3,000 angstroms. A metal contact comprising 1,500 angstroms of titanium, 3,000 angstroms of platinum and 10 microns of gold is applied to the p-region. The n-doped side is then lapped down to a thickness of about 100 microns and a contact comprising 2,000 angstroms of tin, 4,000 angstroms of nickel and 4,000 angstroms of gold is applied. The substrate is then scribed and cleaved to form individual Fabry-Perot cavities having final dimensions on the order of $100 \times 380 \times 625$ microns.

EXAMPLE II

A p-doped region is diffused into the n-doped substrate using the box method with a source comprising a 2.0 percent solution of zinc in gallium saturated with gallium arsenide. The diffusion time is one hour at 800° C. The depth of the junction thus formed is about 1.5 microns.

The substrate is then heat treated. After a protective layer of 1,500 angstroms of $SiO_2$ is applied, the substrate, along with a few milligrams of pure arsenic, is sealed in a quartz ampoule which has been evacuated to a pressure of $10^{-7}$ millimeters of mercury. The ampoule is then heated 30 minutes at 980° C and quenched to 0° C by immersion in ice water. The contacts are formed substantially as described in Example I and have substantially the same dimensions.

Figure 1B:
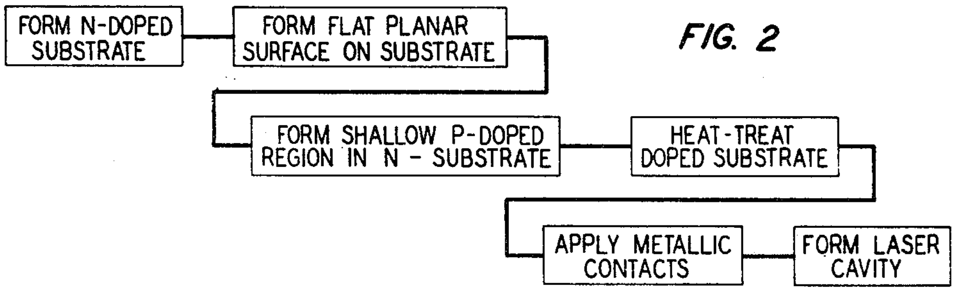

In operation, diodes in accordance with the invention are driven by a source of current pulses. When the operating temperature is near or above T, the transition temperature between short and long delay times; and, for typical diodes, when the current pulse amplitude is on the order of a few amperes, the diodes exhibit Q-switching. FIG. 1 shows the region in temperature and current where Q-switching occurs in one such diode.

It is understood that the above-described procedures are simply illustrative of the many possible specific embodiments which can represent applications of the principles of the invention. Numerous and varied other procedures, particularly those using different but equivalent diffusion techniques, can be devised in accordance with these principles by those skilled in the art without departing from the spirit and scope of the invention.

What is claimed is:

1. A method for making a junction diode laser capable of exhibiting internal Q-switching comprising the steps of:
   forming a planar n-type substrate of gallium arsenide with free electron concentration between $0.7 \times 10^{18}$ and $2.8 \times 10^{18}$ per cubic centimeter;
   diffusing into said planar substrate by a slow diffusion process a p-doped region having a depth which is greater than the diffusion length of injected electrons and less than 4 microns;
   applying electrical contacts to said p-doped and n-doped regions;
   and forming said substrate into one or more laser cavities.

2. The method according to claim 1 wherein said electrical contacts are stripe geometry contacts.

3. The method according to claim 1 wherein:
   the free electron concentration of said n-type impurity is less than $1.4 \times 10^{18}$ per cubic centimeter;
   and said p-doped region is formed in said substrate by a diffusion process using a temperature on the order of 800° C, and impurity source comprising a solution of less than 2.5 percent of acceptor material in gallium and a diffusion time of at least 4 hours.

4. The method according to claim 3 wherein said impurity source comprises a solution of less than 1 percent of acceptor material in gallium.

5. The method according to claim 3 wherein n-type impurity is tin and said p-type impurity is zinc.

6. The method according to claim 3 including the additional step of heat treating the doped substrate at a temperature between 700° C and 1,000° C for at least 30 minutes.

* * * * *